United States Patent
Williams

(10) Patent No.: US 10,218,546 B2
(45) Date of Patent: Feb. 26, 2019

(54) SYSTEMS AND METHODS FOR NONLINEAR DISTORTION DISCOVERY IN ACTIVE CARRIERS

(71) Applicant: CABLE TELEVISION LABORATORIES, INC, Louisville, CO (US)

(72) Inventor: Thomas H. Williams, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 15/711,168

(22) Filed: Sep. 21, 2017

(65) Prior Publication Data
US 2018/0083812 A1    Mar. 22, 2018

Related U.S. Application Data

(60) Provisional application No. 62/397,772, filed on Sep. 21, 2016.

(51) Int. Cl.
| | |
|---|---|
| *H04K 1/10* | (2006.01) |
| *H04L 27/28* | (2006.01) |
| *H04L 27/01* | (2006.01) |
| *H04L 1/00* | (2006.01) |
| *H04L 27/38* | (2006.01) |
| *H04L 27/26* | (2006.01) |
| *H04L 1/20* | (2006.01) |

(52) U.S. Cl.
CPC ............ *H04L 27/01* (2013.01); *H04L 1/0045* (2013.01); *H04L 1/208* (2013.01); *H04L 27/2649* (2013.01); *H04L 27/38* (2013.01)

(58) Field of Classification Search
CPC ....... H04L 27/01; H04L 1/0045; H04L 27/38; H04L 27/2649; H04L 1/206; H04N 21/23605
USPC ....... 375/224, 227, 228, 346, 340, 260, 296, 375/297, 298
See application file for complete search history.

(56) References Cited

U.S. PATENT DOCUMENTS

| | | | |
|---|---|---|---|
| 6,275,523 B1 * | 8/2001 | Chen ...................... | H04L 1/206 375/226 |
| 2015/0012933 A1 * | 1/2015 | Fay .................. | H04N 21/23605 725/27 |

* cited by examiner

*Primary Examiner* — Phuong Phu
(74) *Attorney, Agent, or Firm* — Armstrong Teasdale LLP

(57) ABSTRACT

A digital transmission system includes a transmitter configured to transmit an orthogonal frequency division multiplexing (OFDM) signal along a signal path, a receiver for receiving the OFDM signal from the transmitter and extracting OFDM symbols from the received OFDM signal, and a diagnostic unit configured to (i) demodulate the received OFDM signal to create an ideal signal, (ii) compare the received OFDM signal with the ideal signal to calculate an error signal, (iii) cross-correlate the error signal with the ideal signal, and (iv) determine a level nonlinear distortion from one of the transmitter and the signal path based on the correlation of the error signal with the ideal signal.

5 Claims, 13 Drawing Sheets

SYSTEMS AND METHODS FOR NONLINEAR DISTORTION DISCOVERY IN ACTIVE CARRIERS

CROSS REFERENCE TO RELATED APPLICATIONS

This application claims the benefit of and priority to U.S. Provisional Patent Application Ser. No. 62/397,772, filed Sep. 21, 2016, the disclosure of which is herein incorporated by reference in its entirety.

BACKGROUND

The field of the disclosure relates generally to digital transmission systems, and more particularly, to wired, wireless, and optical digital transmission systems employing active carriers and amplification.

Conventional OFDM transmission technology has a high crest factor, which is the ratio of peak-to-average radio frequency (RF) power. Data Over Cable Service Interface Specification (DOCSIS) technology utilizes OFDM, and experiences a crest factor of approximately 16 decibels (dB). In present usage, cable operators implement one or more carriers of DOCSIS, or DOCSIS version 3.1, at high ends of the downstream cable bandwidth, and operate present coaxial amplifiers with a steep up-tilt, e.g., approximately 15 dB. DOCSIS 3.1 signals may be as wide as 190 megahertz (MHz), and wider bandwidth typically signify greater RF power. Thus, in this example, a DOCSIS 3.1 OFDM signal is considered to be of high RF power, which will particularly stress the dynamic range of an amplifier at the time a transported OFDM signal crests. Moreover, as an amplifier ages, its performance with respect to nonlinear distortion may deteriorate. This problem may be further compounded by the fact that nonlinear distortion in digital signals resembles, on conventional test equipment, like random noise, and is thus difficult to discern from other signal impairments, such as the random noise itself, or other interference.

Common path distortion (CPD) is one example of nonlinear distorter on a cable plant. CPD may be created, for example, by corrosion diodes, and if made by digital carriers, also resembles random noise on test equipment. CPD affects both upstream and downstream signals, and thus there is a need to be able to find and repair CPD problems, as well as a need to be able to find and repair distorting amplifiers that are out of balance, defective, or being improperly operated. In many instances, CPD occurs from connectors, which may or may not be associated with amplifiers. Accordingly, there is also a need to determine, where amplifiers are cascaded, which particular element(s) (e.g., which of several amplifiers) of the cascade are the source of the distortion.

Upstream DOCSIS 3.1 implementations, for example, in a cable modem transmitter, utilize orthogonal frequency division multiple access (OFDMA) modulation. Conventional cable plants may include hundreds of such transmitters operating in burst mode, making it difficult to detect and locate a defective cable modem transmitter on that node. In one example, where a single cable modem is utilizing a maximum bandwidth of 42 MHz, the single cable modem is prone to clip the upstream laser (or A-D converter) when its OFDMA signal crests.

Downstream DOCSIS 3.0 signals, on the other hand, may have a bandwidth of 6 MHz, and utilize quadrature amplitude modulation (QAM) schemes such as 64 QAM or 256 QAM. At such relatively narrower bandwidths, such modulation schemes exhibit lower RF power relative to the total power being amplified, and similarly have a lower crest factor relative to the OFDM signals. One conventional diagnostic technique for downstream signals is a "truck-roll," which measures nonlinear distortion with equipment which physically moves along the signal path, and measures distortion on the signals. Diagnostic techniques presently exist, but typically require that an in-service carrier be taken out of service so that a test signal may be transmitted along the signal path. Exemplary systems and methods for measuring nonlinear distortion in the vacant band are described in greater detail in U.S. Pat. No. 9,209,863, U.S. Pat. No. 9,225,387, and U.S. Pat. No. 9,590,696, the disclosures of which are incorporated by reference herein.

Additionally, conventional diagnostic techniques for nonlinear distortion in downstream OFDM signals do not tend to produce significant or meaningful results. For example, where a 6 MHz channel is transmitted as just one of as many as 150 other channels, diagnostic test results of the one 6 MHz channel will not stand out significantly from the other channels. That is, where a square constellation is produced in the time domain, the test results from a saturated amplifier may simply appear as merely corners of the square constellation being pushed inward towards the origin. Thus, when measuring a single carrier out of 150 carriers, the corners of the resulting constellation would not exhibit significant compression, since the distortion from other uncorrelated carriers would dominate. In contrast, in the case of single carrier transmissions (e.g., wireless), corner compression would be more apparent. Accordingly, it is further desirable to be able to remotely perform nonlinear distortion diagnostic testing without interrupting service on an in-service carrier.

BRIEF SUMMARY

In an embodiment, a digital transmission system includes a transmitter configured to transmit an orthogonal frequency division multiplexing (OFDM) signal along a signal path, a receiver for receiving the OFDM signal from the transmitter and extracting OFDM symbols from the received OFDM signal, and a diagnostic unit configured to (i) demodulate the received OFDM signal to create an ideal signal, (ii) compare the received OFDM signal with the ideal signal to calculate an error signal, (iii) cross-correlate the error signal with the ideal signal, and (iv) determine a level nonlinear distortion from one of the transmitter and the signal path based on the correlation of the error signal with the ideal signal.

In an embodiment, a method of determining a presence of nonlinear distortion in an amplified transmitted signal is provided. The method includes steps of capturing at least one frame of the transmitted signal and extracting symbols therefrom, demodulating the captured signal to create an ideal signal, calculating an error vector for each of the extracted transmission symbols, cross-correlating the created ideal signal with an error vector sequence of the calculated error vectors, and determining the presence of nonlinear distortion in the transmitted signal according to at least one peak value resulting from the step of cross-correlating.

In an embodiment, a method of determining a presence of nonlinear distortion in a transmitted orthogonal frequency division multiplexing (OFDM) signal is provided. The method includes steps of importing at least one distorted OFDM block in the frequency domain, equalizing the imported OFDM frequency domain block to remove linear distortion, determining a plurality of OFDM frequency domain symbols from the equalized OFDM frequency domain block, creating a frequency domain error series from each of the determined OFDM frequency domain symbols, converting the equalized OFDM frequency domain block in the determined OFDM frequency domain symbols into the time domain to form a time domain transmission series, converting the frequency domain error series into the time domain to form a time domain error series, cross-correlating the time domain transmission series with the time domain error series, and measuring a DC term for nonlinear distortion from a result of the step of cross-correlating.

In an embodiment, a method of determining a presence of nonlinear distortion in a time domain signal is provided. The method includes steps of importing from the time domain signal, at least one distorted signal block including a plurality of time domain symbols, equalizing the imported time domain block to remove linear distortion, determining the plurality of time domain symbols from the equalized time domain block, creating a time domain transmission series from the equalized time domain block and the determined plurality of time domain symbols, creating a time domain error series from each of the determined plurality of time domain symbols, cross-correlating the time domain transmission series with the time domain error series, and measuring a DC term for nonlinear distortion from a result of the step of cross-correlating.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
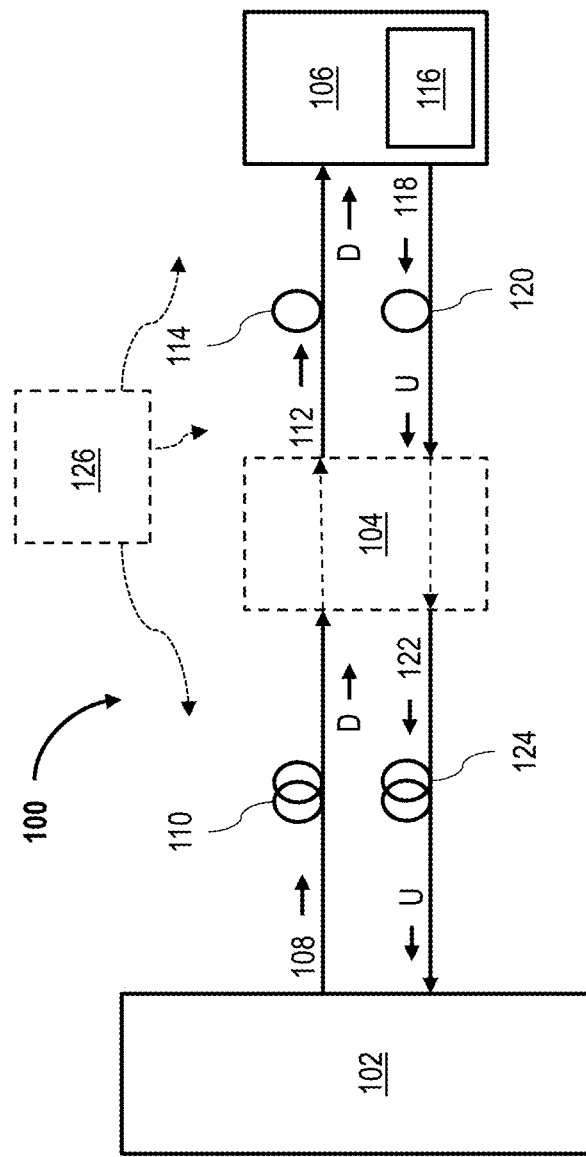
FIG. 1 is a schematic illustration depicting an exemplary digital transmission system, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

In an exemplary embodiment, systems and methods are provided to detect and locate nonlinear distortion in upstream and downstream OFDM and OFDMA signals, on both wired and wireless channels. In some embodiments, defects and defective devices that cause nonlinear distortion are detected and located. In an additional or alternative embodiments, distorting amplifiers are detected and located, whether used singly, or in a cascade of multiple amplifiers. The present systems and methods may be implemented from locations remote to the source(s) of nonlinear distortion, and will be implemented on in-service transmission lines or wireless signal paths without having to take the in-service line/path out of service.

In an exemplary embodiment, the present systems and methods demodulate received signals to create ideal signals, and cross-correlate the ideal signal, or the received signals that are not made ideal, with an error signal to create an error vector signal. In some embodiments, a sequence of the error vector is cross-correlated with the ideal signal, and nonlinear distortion levels are determined from the correlation peak. In at least one embodiment, the ideal signal is created by converting an OFDM frequency domain signal into the time domain, e.g., by an inverse fast Fourier transform (IFFT).

In other embodiments, samples of the ideal signal are plotted against the received signal, and a transfer function for distortion is derived therefrom, e.g., utilizing a Taylor series. The present systems and methods maybe implemented anywhere within the network of the transmission system, and are of particular use where the signal being demodulated makes up a significant portion of the total distorting power.

FIG. 1 is a schematic illustration depicting an exemplary digital transmission system 100. System 100 includes a transmitter 102, an optional amplifier 104, and a downstream receiver 106. Transmitter 102 may represent, for example, a cable operator, a central office, a communications hub, an optical hub, or an optical line terminal (OLT), and may include additional receiver circuitry (not shown), or may be a transceiver capable of both transmission and reception. Where present, amplifier 104 may be, for example, a single amplification source, or a cascade of multiple amplifiers disposed along a downstream transmission path of system 100. In some embodiments, transmitter 102 is a broadcast transmitter that creates distortion in the broadcast, and system 100 does not include amplifier 104 between transmitter 102 and receiver 106. Downstream receiver 106 may be, for example, a downstream termination unit, which may include, without limitation, a customer device (e.g., a mobile telephone, a cable modem, a cable modem termination system (CMTS), etc.), customer premises (e.g., an apartment building), a business user, or an optical network unit (ONU).

In exemplary operation, transmitter 102 transmits an OFDM signal 108 in the downstream direction D to amplifier 104 over a first downstream transmission line 110. Amplifier 104 amplifies OFDM signal 108, and relays and amplified OFDM signal 112 in the downstream direction D to downstream receiver 106 over a second downstream transmission line 114. In the embodiments described further below, amplified OFDM signal 112 includes nonlinear distortion from amplifier 104, and/or other nonlinear interference sources along the downstream transmission path of system 100. In some embodiments, receiver 106 represents a plurality of separate receivers 106 (not separately illustrated).

In an alternative or supplemental operation, downstream receiver 106 includes an upstream transmission unit 116, capable of transmitting an OFDMA signal 118 in the upstream direction U to amplifier 104 along a first upstream transmission line 120. Amplifier 104 then relays and amplified OFDMA signal 122 in the upstream direction U to transmitter 102 along a second upstream transmission line 124. Downstream receiver 106 and upstream transmission unit 116 may be separate devices, or may constitute a single transceiver device. In some embodiments, upstream transmission unit 116 represents a plurality of separate upstream transmission units 116 (not separately illustrated), and amplifier 104 may further include a multiplexer or combiner (not shown) to combine multiple respective OFDMA signals 118 into a single amplified OFDMA signal 122.

Upstream transmission lines 120, 124 may be separate from downstream transmission lines 110, 114, or the upstream and downstream transmissions may be shared along a single transmission line capable of transmitting multiple signals in both the upstream and downstream directions. In coaxial implementations, amplifier 104 is a two-way amplifier, and a common coaxial cable is utilized for the upstream and downstream transmissions. For the examples described with respect to system 100, transmission lines 110, 114, 120, 124 are described, for ease of explanation, as tangible transmission media, such as coaxial cable, electrical wires, and/or fiber optics. The principles of the present systems and methods though, are also applicable to wireless transmission paths and/or transmission bands (e.g., Wi-Fi, LTE, LTE-U), which, as described above, may optionally exclude amplifier 104 from the signal path.

The graphical and data results, as described with respect to the embodiments below, illustrate several examples of signal processing and diagnostic testing that may be performed by a diagnostic unit 126, which may be part of transmitter 102, part of receiver 106, and/or a separate and independent unit. In some embodiments, diagnosed unit 126 may be a software module stored in a memory (not shown) of transmitter 102 or receiver 106 (or a separate unit), and executed by a respective processor (also not shown) thereof.

In at least one example, the performance and functionality of diagnostic unit 126 may be produced from a test simulation of system 100. For example, system 100 may be simulated utilizing a LeCroy Arbitrary Waveform Generator ArbStudio 1102, controlled by a programmed PC, operating as transmitter 102, and a LeCroy HDO-6104 digital oscilloscope operating as receiver 106. In operation of the simulation, the Arbitrary Waveform Generator generates an OFDM signal (occupying the 5-85 MHz range in this example) and creates distortion in the amplifier. The resulting distorted waveform is captured by the digital oscilloscope. In the simulation, increases in the signal level, as well as increases or decreases in the simulated nonlinear distortion, may be adjusted by pad (attenuator) changes. This test configuration thus approximately simulates a cable OFDM and OFDMA transmission system, and verifies the several plots and/or correlations described below.

Figure 2:
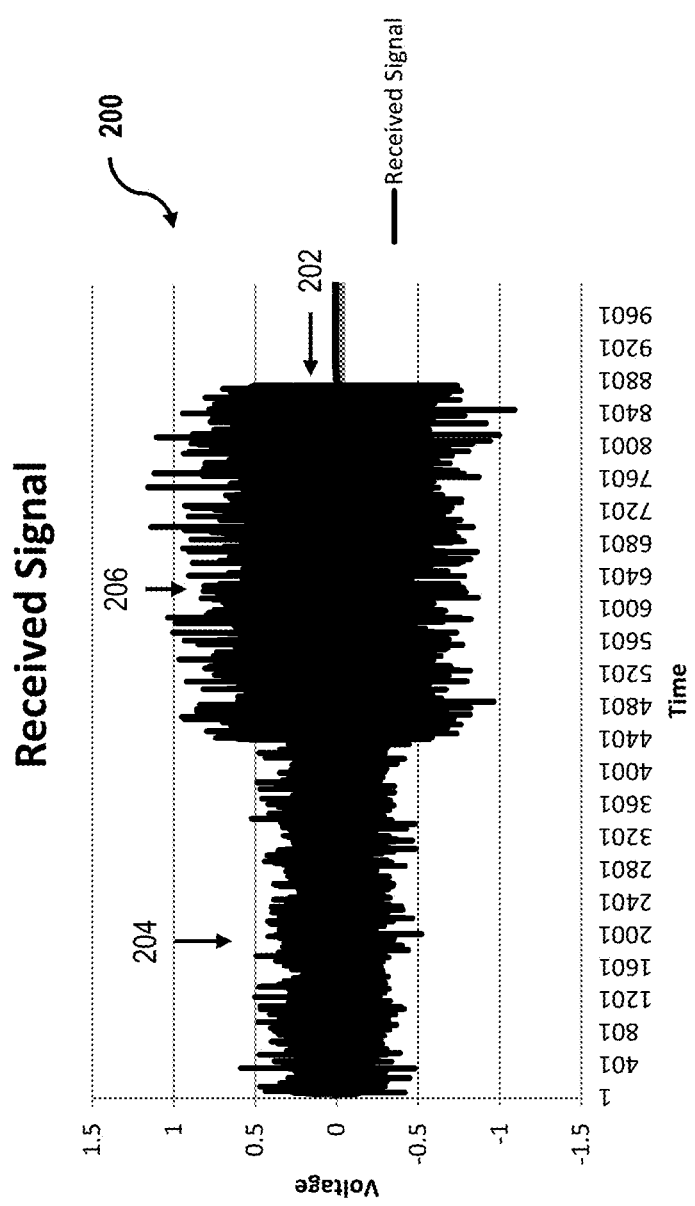
FIG. 2 is a graphical illustration of the time domain response of a received digital signal, in accordance with the example depicted in FIG. 1.

FIG. 2 is a graphical illustration of a time domain response 200 of a digital signal 202 received in system 100, FIG. 1. In the exemplary embodiment, digital signal 202 is an OFDM signal including a first burst portion 204 and a second burst portion 206. In some embodiments, first burst portion 204 is a quadrature phase shift keying (QPSK) test signal utilized for channel characterization, and second burst portion 206 is a higher-amplitude signal with respect to first burst portion 204, and may be a 64 QAM OFDM signal that includes nonlinear distortion.

In operation, a downstream OFDM frame of digital signal 202 is captured at a terminal device (e.g., receiver 106, FIG. 1). In some embodiments, simple network management protocol (SNMP) management information bases (MIBs) are utilized in a DOCSIS implementation, and frame capture may alternatively be performed using a vector signal analyzer. In at least one embodiment, frame capture is performed using a baseband capture device, such as a digital oscilloscope, and an FFT may be executed on the signal captured thereby. In the example illustrated in FIG. 2, response 200 represents a captured time series waveform from a digital oscilloscope, and plotted as frequency domain I-Q symbols that have been transformed into the time domain, for a sample rate of 250 million samples per second. First burst portion 204 thus includes Q PSK training symbols, and second burst portion 206 includes 64 QAM symbols. Second burst portion 206 thus simulates, and/or functionally represents, a 5-85 MHz DOCSIS 3.1 OFDMA transmission.

Figure 3:
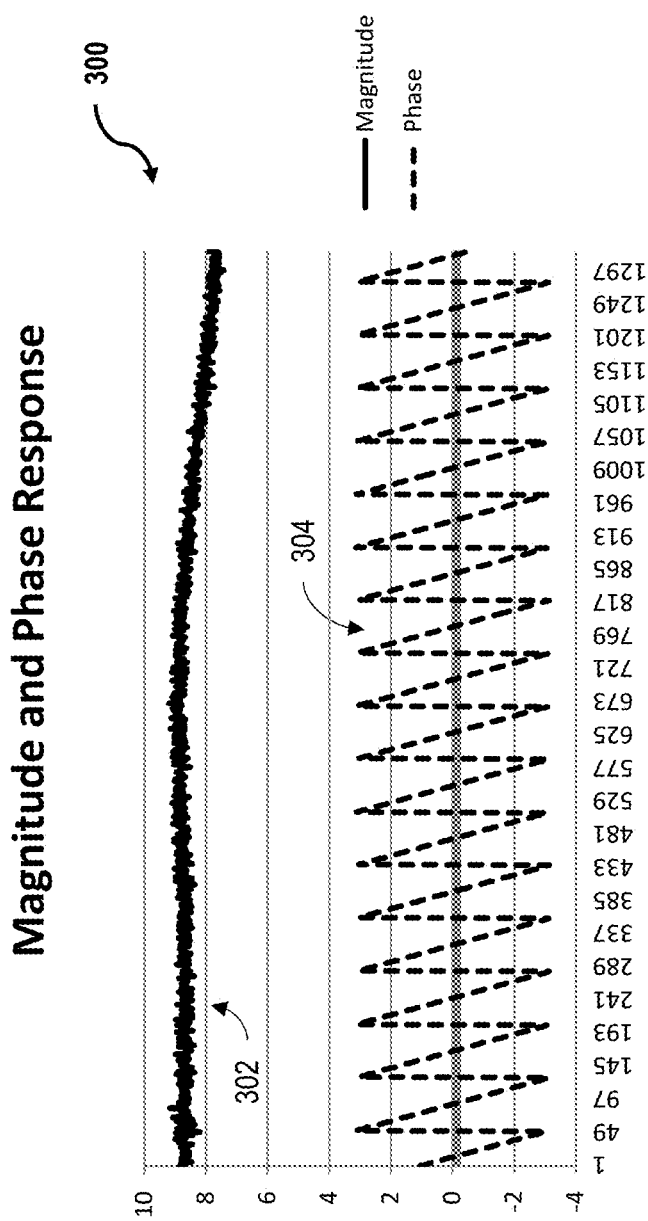
FIG. 3 is a graphical illustration of the complex channel response determined from the received digital signal depicted in FIG. 2.

FIG. 3 is a graphical illustration of a complex channel response 300 determined from first burst portion 204, FIG. 2. Response 300 includes a linear magnitude component 302, and a phase component 304. In an exemplary functional operation, response 300 may be obtained by performing a frequency domain characterization of the respective channel from which response 300 is received, effectively using signal 204 as a training signal or channel characterization signal. The obtained channel response may then be used to perform equalization.

Figure 4:
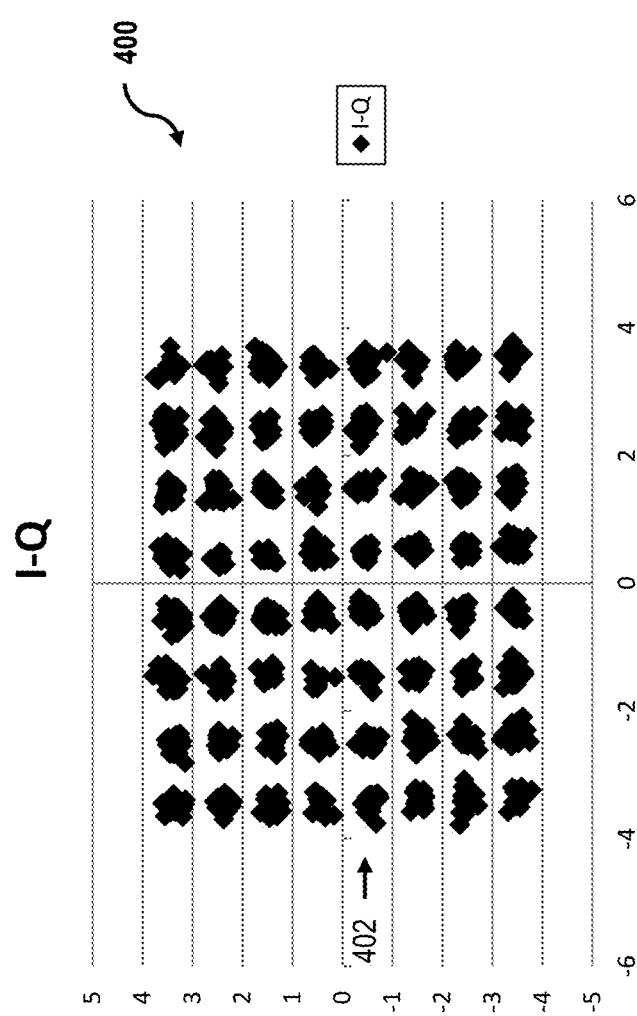
FIG. 4 is a graphical illustration of a constellation plot of the received OFDM symbols in the frequency domain after correction of the channel response depicted in FIG. 3.

FIG. 4 is a graphical illustration of a constellation plot 400 of received OFDM symbols 402 in the frequency domain after correction using channel response 300, FIG. 3. In an exemplary embodiment, the point spread of OFDM symbols 402 may be caused by nonlinear distortion, noise, or both. In an exemplary operation, OFDM frequency domain symbols 402 are sliced to create a "perfect" noise- and distortion-free constellation. Thus, in constellation 400, the 64 constellation points all become represented as dots. In further operation, a frequency domain error vector may be created for each of OFDM symbols 402. The error vectors may be computed as the Euclidian distance from the ideal location of a particular symbol to the actual measured location of the distorted/noisy symbol. In this example, it is presumed that no slicing errors occur, and that all symbols are within respective correct decision thresholds.

Figure 5:
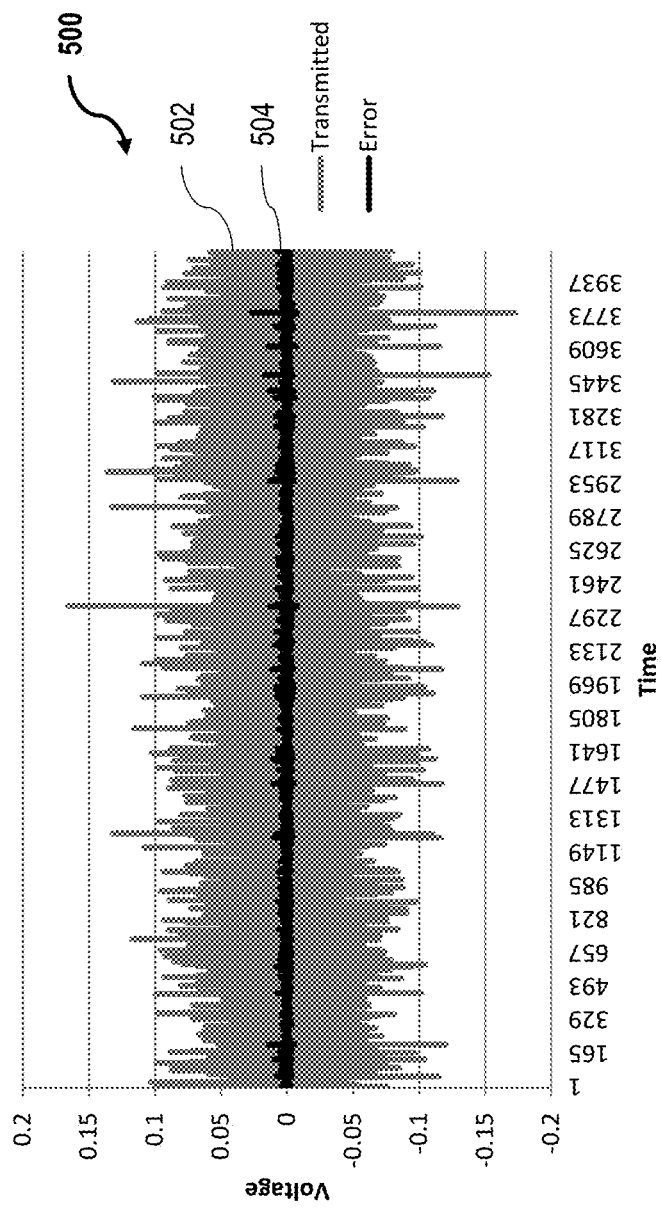
FIG. 5 is a graphical illustration of a time domain plot of an ideal transmitted signal in relation to an error signal, in accordance with an embodiment.

FIG. 5 is a graphical illustration of a time domain plot 500 of an ideal transmitted signal 502 in relation to an error signal 504. In the example illustrated in FIG. 5, the time series of error signal 504 is represented by the black line, and the time series of ideal transmitted signal 502 is represented by the grayscale line. In exemplary operation, ideal transmitted signal 502 is obtained by converting noise-free frequency domain symbols 402, FIG. 4, into the time domain using an IFFT, which effectively results in the unimpaired complex time series that is ideal transmitted signal 502. In an exemplary DOCSIS implementation, FFT/IFFT size may be 2048, 4096, or 8192 complex symbols (e.g., signal 502). Similarly, error signal 504 is obtained by converting the error vectors (described above with respect to constellation 400, FIG. 4) into a time domain series (e.g., also using an IFFT).

Response 500 thus demonstrates several particular relationships that may exist with respect to OFDM transmissions regarding distortion, and resulting error signals. For example, it can be seen from FIG. 5 that, at times when the time domain ideal transmitted signal 502 crests in the negative direction, the corresponding error signal 504 increases in the positive direction. It may also be noted from FIG. 5 that, for the amplifier utilized in this example, distortion is more prevalent when ideal submitted signal 502 moves in the negative direction, as opposed to movement in the positive direction.

Figure 6:
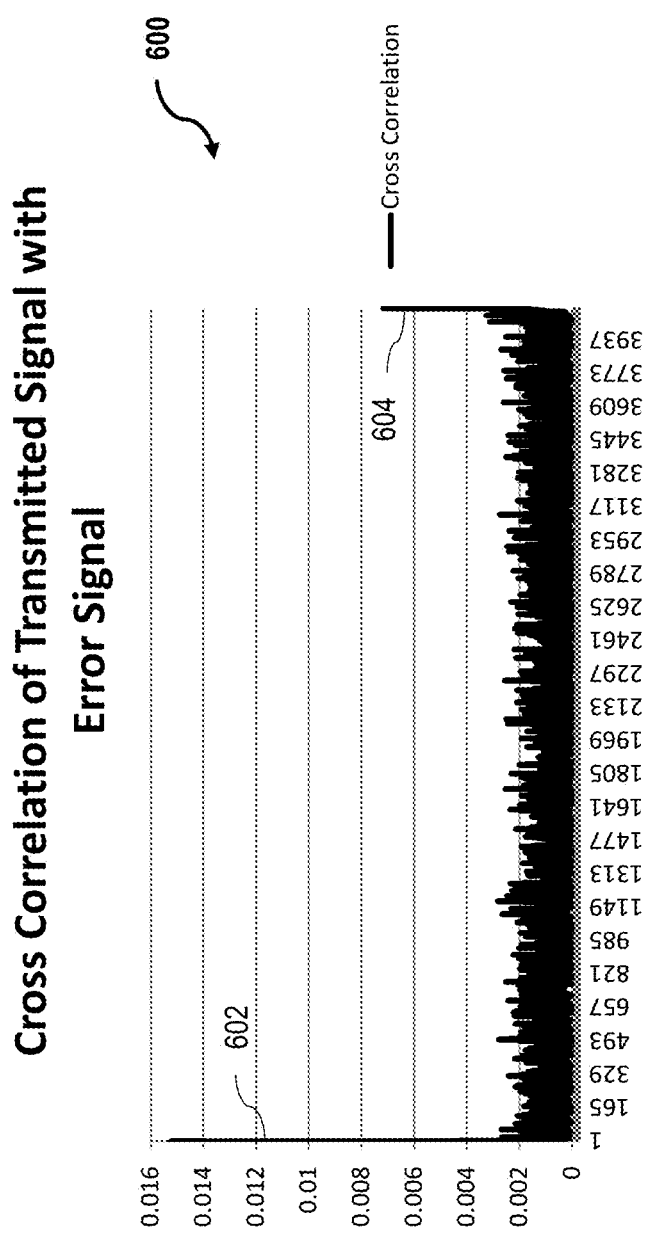
FIG. 6 is a graphical illustration of a cross-correlation plot of the transmitted signal with the error signal depicted in FIG. 5.

FIG. 6 is a graphical illustration of a cross-correlation plot 600 of ideal transmitted signal series 502 with error signal series 504, FIG. 5. Plot 600 includes DC term 602 and adjacent term 604, which are caused by nonlinear distortion. Portions of plot 600, between DC term 602 and adjacent term 604, result from the convolution of error signal 504, FIG. 5, with the non-cresting OFDM signal samples, random noise, as well as other ingressing signals. As can be seen from FIG. 6, the DC terms increase rapidly with an increase in distortion levels.

In exemplary operation plot 600 is obtained by cross-correlating the unimpaired time domain series 502 with the time domain error vectors signal 504. If nonlinear distortion is present, there will be a resulting DC term in the correlation results of plot 600, or even adjacent terms (peaks) on both ends, as illustrated in FIG. 6, with DC peak located at one end. The DC term is caused by a temporal peak not being achieved at the terminal unit due to clipping or other signal-limiting phenomena. The amplitude of the DC term indicates the level of nonlinear distortion in the signal. Otherwise, the result of the convolution resembles random noise, because at the instant a transmitted signal peaks in power, a time domain error is created. Mathematically, it may be noted that multiplication in the frequency domain may often be used as a functional equivalent to convolutions in the time domain. Thus, in an alternative embodiment, frequency domain processing may be used instead of the time domain convolution function. Mathematically, signal clipping may perform the same function as subtracting the clipped (or missing) voltage from an original signal.

Figure 7:
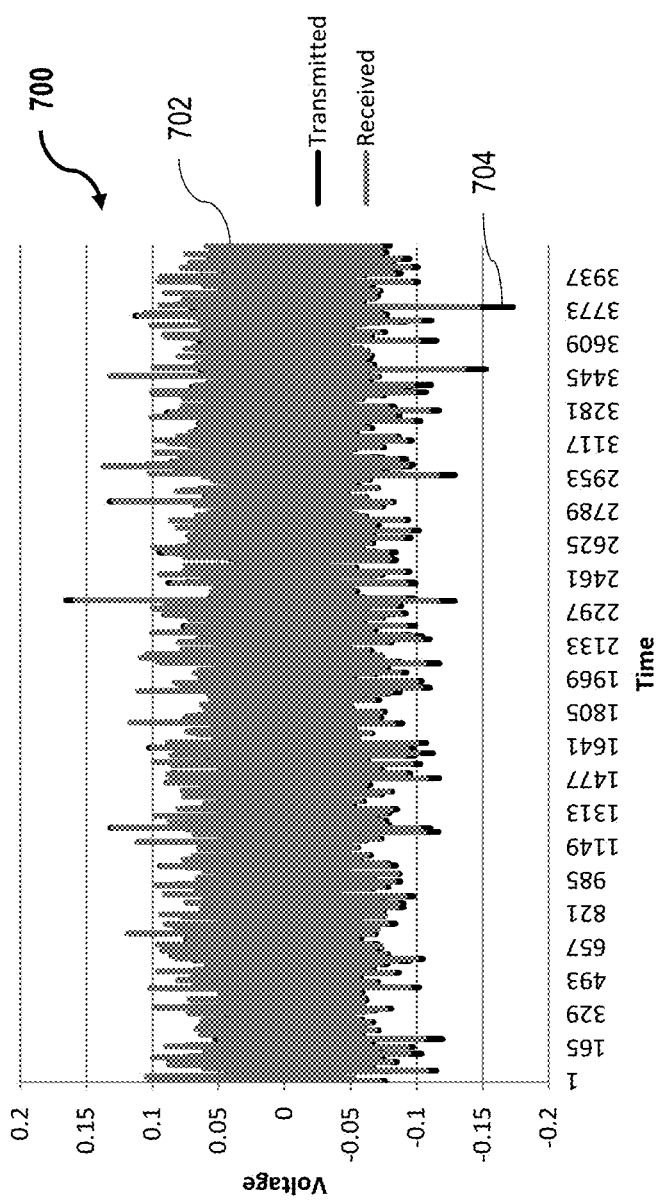
FIG. 7 is a graphical illustration of an overlay plot of the respective time domain responses of a transmitted signal and corresponding received signal, according to an exemplary embodiment exhibiting moderate distortion.

FIG. 7 is a graphical illustration of an overlay plot 700 of respective time domain responses of a received signal 702 (illustrated in grayscale) overlaid on a corresponding transmitted signal 704 (illustrated in black), in the presence of moderate distortion/clipping levels. Received signal 702 represents values of transmitted signal 704, minus the error, as described above. Thus, in an overlay plot, received signal 702 would completely cover transmitted signal 704 where no error signal was present. In contrast, where the error signal is present, clipping occurs, and portions of transmitted signal 704 are visible behind corresponding portions of received signal 702 (i.e., where clipping occurs). It can be further noted from the illustration of FIG. 7 that more clipping occurs (i.e., more of transmitted signal 704 is visible) where signals 702, 704 move in the negative direction, as opposed to less visible clipping in the positive direction.

Figure 8:
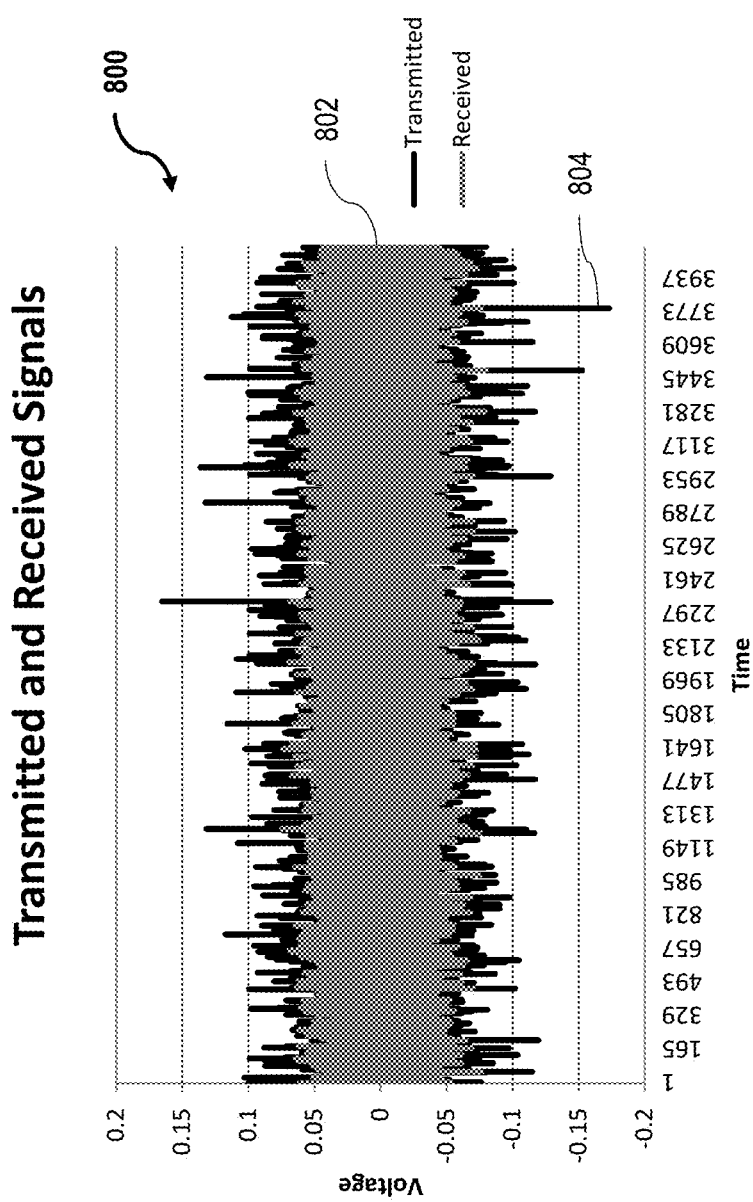
FIG. 8 is a graphical illustration of an overlay plot of the respective time domain responses of a transmitted signal and corresponding received signal, according to an alternative embodiment exhibiting significant distortion.

FIG. 8 is a graphical illustration of an overlay plot 800 of respective time domain responses of a received signal 802 data for (illustrated in grayscale) overlaid on a corresponding transmitted signal 804 (illustrated in black), in the presence of significant (e.g., severe) distortion/clipping levels. Similar to overlay plot 700, FIG. 7, above, received signal 802 represents values of transmitted signal 804, minus the error. Thus, where the more significant error signal is present, greater levels of clipping occur, and much larger portions of transmitted signal 804 are visible behind corresponding portions of received signal 802.

According to embodiments described above (and also further below), if slicing errors occur, the slicing errors may be determined utilizing forward error correction (FEC), and a successful FEC solution may come up in an alternative embodiment, be solved in reverse to determine what was ideally transmitted. That is, a corrected time series may be determined through the FEC implementation, instead of the use of the IFFT, described above. In at least some embodiments, where simultaneous symbol capture is performed at the headend (e.g., at transmitter 102, FIG. 1) and/or in the field, the headend OFDM signal would be expected to be error-free, and therefore may be used to create an ideal transmit signal. With respect to upstream transmission, a triggered CMTS spectrum analysis may be implemented to evaluate the transmission of each respective cable modem. This alternative subprocessing is of particular value where cable modems are operating at or near maximum power, and would thus be expected to produce more nonlinear distortion than cable modems operating at lower power levels. Such processing techniques may also reveal nonlinear distortion originating inside a home environment, such as from a corrosion diode, or an overloaded passive component such as a splitter.

Figure 9:
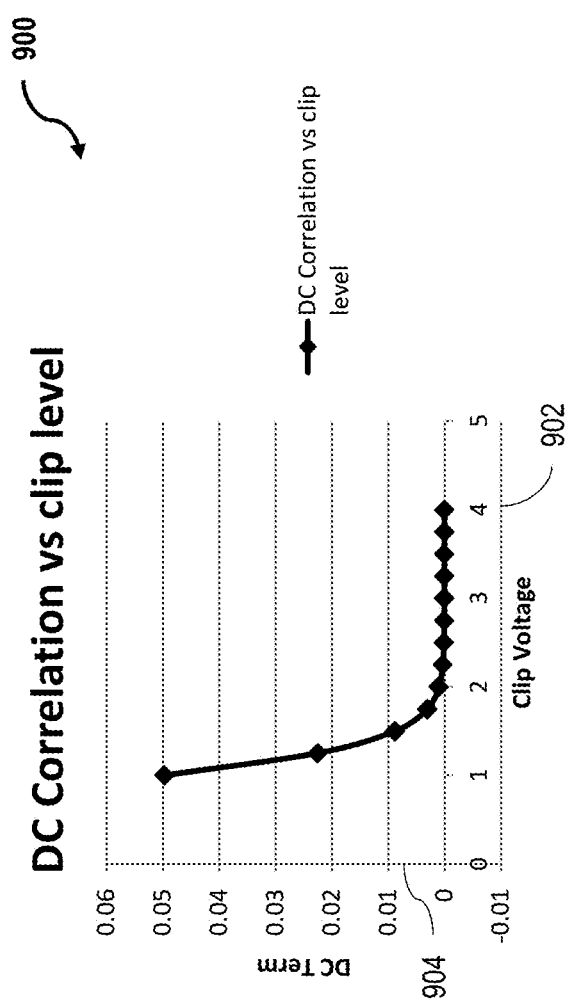
FIG. 9 is a graphical illustration of a correlation plot of the clip voltage versus the DC term of an OFDM waveform, in accordance with an embodiment.

FIG. 9 is a graphical illustration of a correlation plot 900 of a clip voltage 902 versus a DC term 904 of an OFDM waveform (not shown in FIG. 9), according to the embodiments described above. In the example illustrated in FIG. 9, the OFDM waveform is clipped for both positive and negative voltages. Accordingly, as the severity of the clipping increases, distortion rises rapidly. That is, correlation plot 900 demonstrates how nonlinear distortion levels (i.e., DC term 904) increase rapidly as the clipping severity increases. In some embodiments, correlation plot 900 may be produced mathematically, by utilizing both the high- and low-clipping portions of a received OFDM signal (e.g., digital signal 202, FIG. 2). In the exemplary embodiment, the principles described herein are further advantageous value for other types of OFDM transmission systems, including without limitation, broadcast (e.g., ATSC-3, DVB-T etc.) and OFDM transmissions from LTE cell towers.

Figure 10:
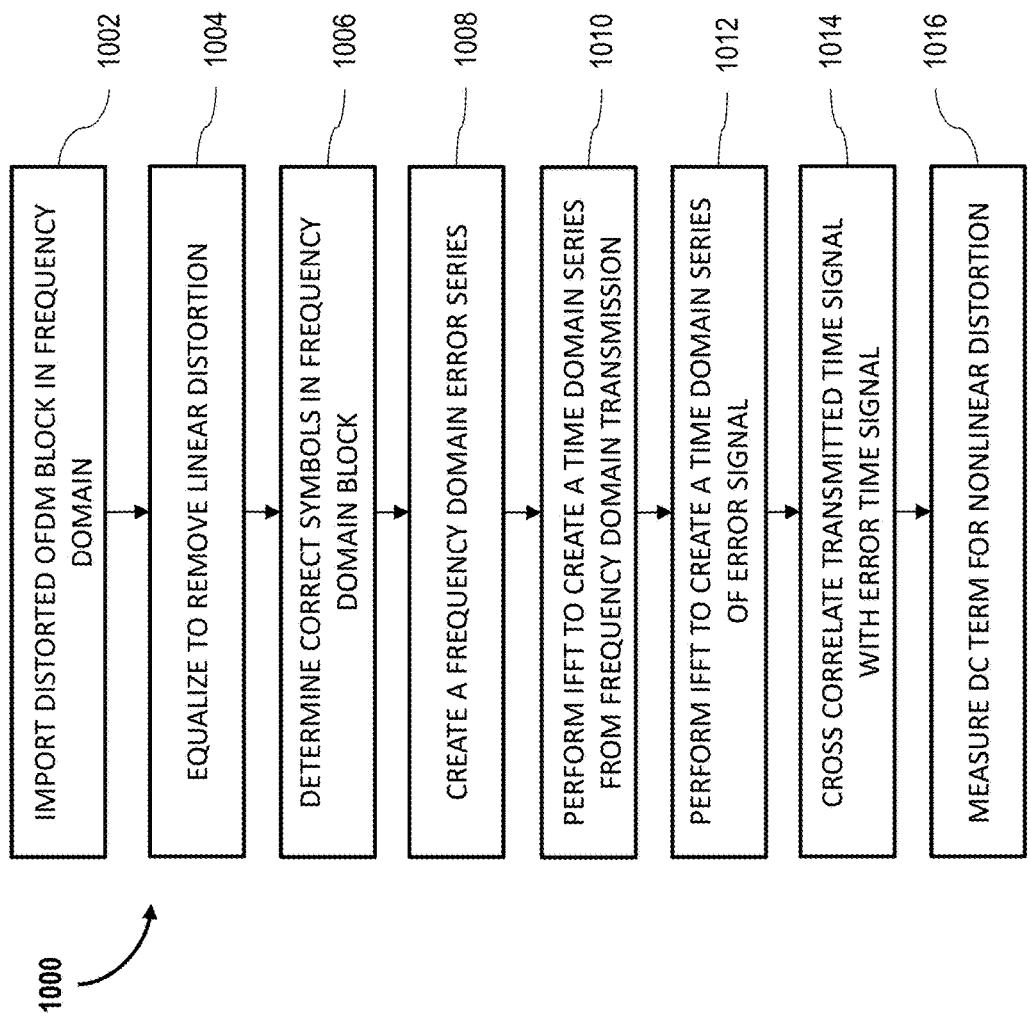
FIG. 10 is a flow chart diagram of an exemplary cross-correlation process for an OFDM signal, in accordance with an embodiment.

FIG. 10 is a flow chart diagram of an exemplary cross-correlation process 1000 for an OFDM signal, in accordance with embodiments described above. Process 1000 begins at step 1002, in which a distorted OFDM block or frame (e.g., frame of digital signal 202, FIG. 2), including a plurality of OFDM symbols, is imported as a frequency domain signal, or alternatively converted into the frequency domain. In step 1004, the imported/converted frequency domain block is equalized to remove linear distortion. (See e.g., FIG. 3). In step 1006, the correct OFDM symbols are determined from the equalized frequency domain block. (See e.g., FIG. 4). In step 1008, a frequency domain error series is created for each of the frequency domain OFDM symbols determined in step 1006. (See e.g., FIG. 4). In step 1010, a time domain transmission series is created (e.g., by an IFFT) from the equalized frequency domain block and OFDM symbols resulting from steps 1004 and 1006. (See e.g., FIG. 5). In step 1012, a time domain error series is created (e.g., also by an IFFT) from the frequency domain error series created in step 1008. (See e.g., FIG. 5). In step 1014, the ideal time domain transmission series created in step 1010 is cross-correlated with the time domain error series created in step 1012. (See e.g., FIG. 6). In step 1016, the DC term for nonlinear distortion is measured. (See e.g., DC term 904, FIG. 9).

Figure 11:
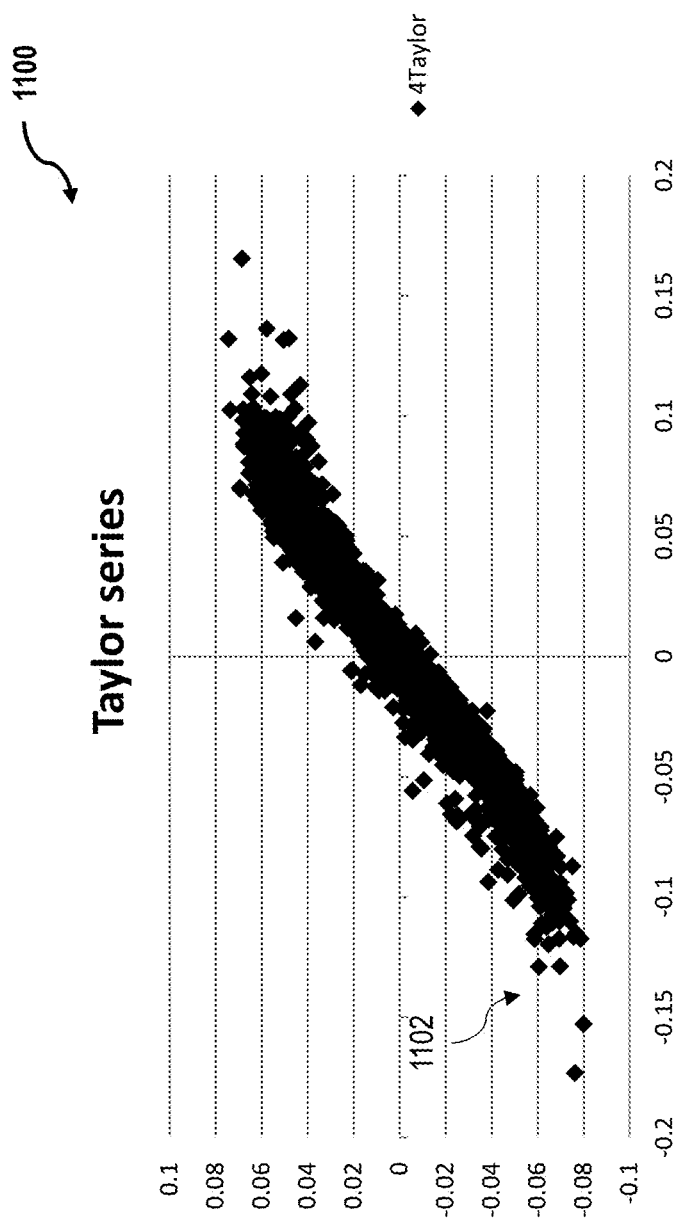
FIG. 11 is a graphical illustration of a plot of the input voltage versus the output voltage of an amplifier, in accordance with an embodiment.

FIG. 11 is a graphical illustration of a plot 1100 of an input voltage 1102 versus an output voltage 1104 of an amplifier (e.g., amplifier 104, FIG. 1). In the exemplary embodiment, plot 1100 represents a curve that may be smoothed by averaging, and then analyzed for Taylor series coefficients. In at least one embodiment, the Taylor series is obtained by first plotting ideal symbol values against actual received symbol samples, which will result in a series of plot points 1102 that collectively produce a bending line shape for plot 1100, from which curve fitting techniques may be applied to derive the Taylor series coefficients. In this example, the bending line shape of plot 1100 is illustrative of a transfer function, and fewer points appear at the highest and lowest voltage levels due to the Gaussian distribution of the OFDM test signal used to produce the data results for FIG. 11.

In some embodiments, the OFDM signal may be captured as a complex signal, or with a non-DC center frequency. In such instances, the captured OFDM signal may be first converted into a baseband (i.e., DC) signal before analysis and Taylor series derivation. That is, the signal analysis and derivation processes are performed on a real the converted real signal, and not on the captured complex signal. In some embodiments, these techniques are of particular value with respect to distortion-producing elements, such as laser diodes, which may clip unsymmetrically.

As described above, the advantageous embodiments herein are useful for a variety of OFDM signals that contain nonlinear distortion. Systems and methods according to these embodiments are capable of realizing significant advantages over conventional transmission systems. For example, implementing the present embodiments, a modulation error ratio (MER) for one or more of the several system components may be decomposed according to whether distortion may be nonlinear, random, and/or periodic (such as with a continuous wave (CW) ingress or signal). Additionally, diagnostic testing according to the present embodiments may be repeated in a sequence down a cascade of multiple amplifiers, in order to identify and locate a defective amplifier in the cascade. In some embodiments, where the diagnostic testing is performed remotely, each amplifier in the cascade may be diagnosed with substantial simultaneity. In at least one alternative embodiment, inner constellation points (see e.g., FIG. 4) may be utilized and set of pilot signals, in order to establish the presence of non-distorted symbols, and then to accurately establish slicing thresholds.

In an example of a DOCSIS 3.1 implementation, the present systems and methods may be executed with simultaneous symbol capture (e.g., unimpaired OFDM symbol capture at the headend). In such implementations, there should be no slicing errors, should have no slicing errors, and the captured symbols may be used to create an unimpaired signal for convolution with an error signal, which may also be captured from the field from multiple locations simultaneously.

In an alternative implementation, two or more OFDM blocks are simultaneously captured, recorded, and combined, such that the combined OFDM block may be processed as a single higher-power and wider-bandwidth signal when performing the digital signal processing. For time domain transmissions in particular, such OFDM block combination techniques are advantageous for multiple 6 MHz 256 QAM single carrier signals, for example, many of which may be combined into a single block and processed as a single wideband signal. In some instances, when multiple signals are combined, the Central Limit Theorem may apply, and the resulting composite signal may become more Gaussian in its plotted appearance.

In further alternative embodiments, different processing steps may be substituted for the cross-correlation subprocesses. Such alternative subprocesses are also capable of determining if, at times when the magnitude of a transmitted signal crests, the error signal also crests (i.e., a corresponding received signal is unable to reach the same magnitude level as the transmitted signal). Examples of such alternative embodiments are described further below with respect to FIGS. 12-13.

Figure 12:
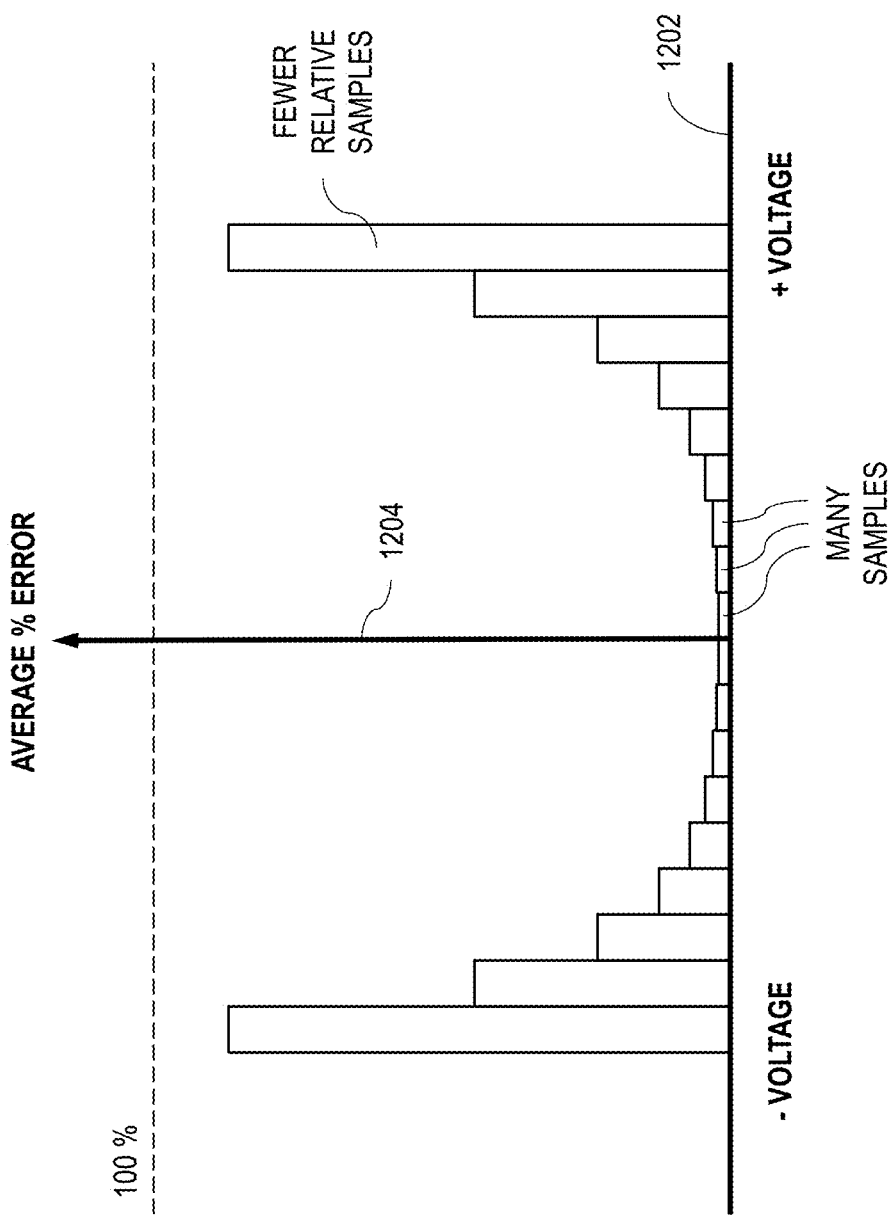
FIG. 12 is a graphical illustration of a cross-correlation plot of the sample voltage with the average percentage error in received voltage samples, according to an alternative embodiment.

FIG. 12 is a graphical illustration of a cross-correlation plot 1200 of a sample voltage 1202 with an average percentage error 1204 in the received voltage samples. As illustrated in FIG. 12, individual time domain signal samples are collected and arranged into "bins" according to magnitude. Because an OFDM signal is expected to peak only occasionally, significantly more signal samples will be grouped into the lower-power bins then into the higher-power bins. Once the signal samples are so grouped, an average error ratio for each been may be computed, and the results thereof then plotted as plot 1200.

As illustrated in FIG. 12, because of the relatively smaller number of samples contained within the higher-power bins, the higher-power bins will experience greater levels of random error due to less averaging. That is, where the voltage is higher, so is the average error, which is caused by nonlinear distortion. In at least one embodiment, data from plot 1200 is arranged into a histogram (not shown) for the number of samples versus power, which would indicate whether the received signal is Gaussian, or non-Gaussian, shaped. In this example, plot 1200 is drawn for illustration purposes, and should not be considered as being drawn to-scale. Implementations of a testing scheme according to FIG. 12 are further useful for non-OFDM signals utilizing an amplifier, including without limitation, audio amplifier/speaker performance, as well as other types of modulated signals or modulation techniques, such as code division multiple access (CDMA) and/or wavelet modulation.

Figure 13:
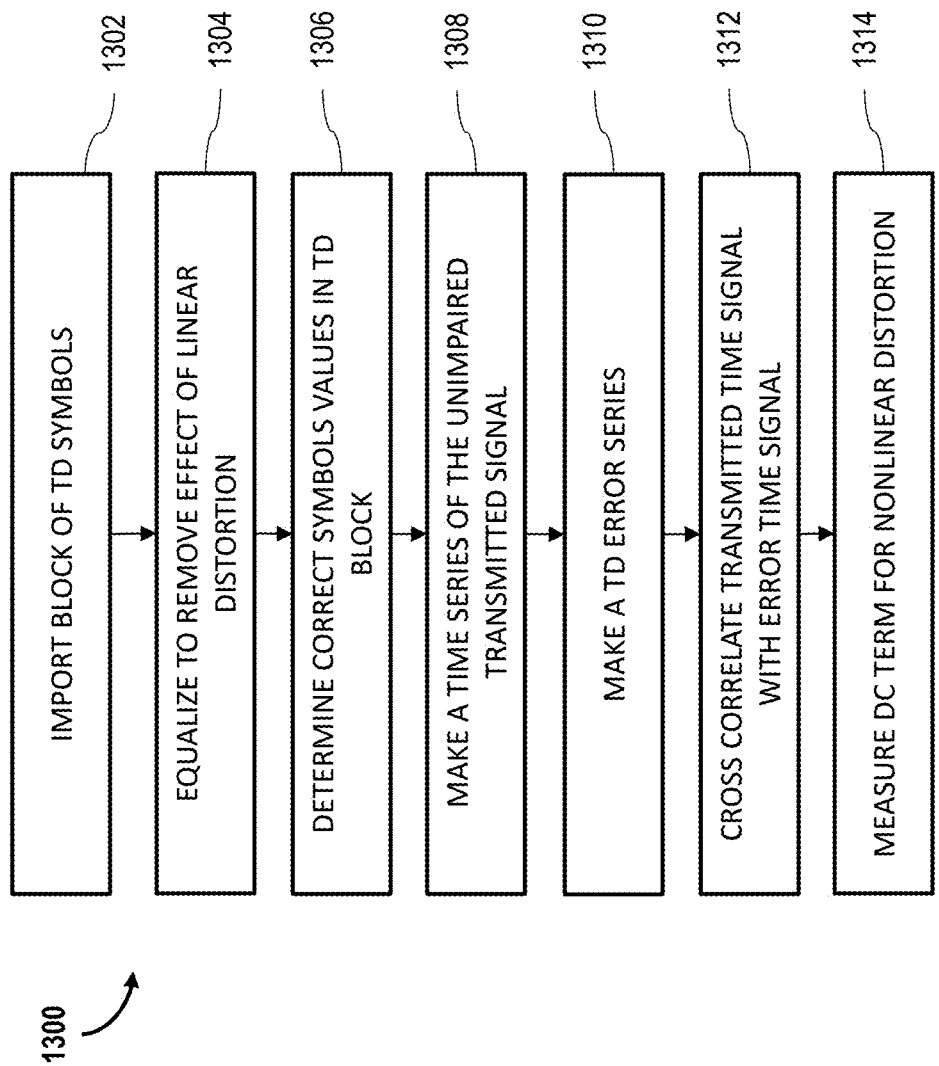
FIG. 13 is a flow chart diagram of an alternative cross-correlation process for a time domain QAM signal, in accordance with an embodiment.

FIG. 13 is a flow chart diagram of an alternative cross-correlation process 1300 for a time domain QAM signal (or other types of transmitted time domain signals, as described herein). Process 1300 is similar to process 1000, FIG. 10, except that the error signal determination in process 1300 is substantially performed in the time domain, as opposed to the frequency domain. Process 1300 begins at step 1302, in which a block of the time domain QAM signal, including a plurality of time domain QAM symbols, is imported. In step 1304, the imported time domain block is equalized to remove linear distortion. In step 1306, the correct QAM symbols are determined from the equalized time domain block. In step 1308, time domain transmission series is created from the equalized time domain block and QAM symbols resulting from steps 1304 and 1306. In step 1310, a time domain error series is created for each of the time domain QAM symbols determined in step 1306. In step 1312, the time domain transmission series created in step 1308 is cross-correlated with the time domain error series created in step 1310. In step 1314, the DC term for nonlinear distortion is measured. Accordingly, the present systems and methods are advantageously useful signals transmitted and received in both the time domain and the frequency domain.

Systems and methods according to the present embodiments represent further significant improvements over conventional transmission schemes by providing dynamic detection and location of nonlinear distortion sources for active time domain and frequency domain carriers (i.e., single carrier and multicarrier). Nonlinear distortion may be determined by demodulating a received signal to create an ideal signal, determining an error vector for each received symbol, and cross-correlating the error vector sequence with the ideal signal to indicate the presence of nonlinear distortion from the correlation peaks. For OFDM frequency domain signals, frequency domain data may be converted into the time domain before cross-correlation is performed.

The present embodiments provide further advantages over conventional signal processing techniques, by plotting received signal samples against ideal samples and deriving a transfer function from the curve plotted therefrom. We're slicing errors are present with respect to the received signal, FEC solutions may be implemented in reverse to obtain the ideal signal. The present embodiments are useful in a variety of signal transmissions in transmission schemes, including without limitation, OFDM, OFDMA, DOCSIS, SC-FDMA, QAM, QPSK, ATSC/ATSC-3, DVB-T, LTE, and LTE-U.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of determining a presence of nonlinear distortion in a transmitted signal, comprising the steps of:
   capturing at least one frame of the transmitted signal and extracting symbols therefrom, wherein the transmitted signal comprises an orthogonal frequency division multiplexing (OFDM) signal in the frequency domain;
   demodulating the captured signal to create an ideal signal, further comprising a substep of performing an inverse Fourier transform on the OFDM signal;
   calculating an error vector for each of the extracted transmission symbols;
   cross-correlating the created ideal signal with an error vector sequence of the calculated error vectors; and
   determining the presence of nonlinear distortion in the transmitted signal according to at least one peak value resulting from the step of cross-correlating.

2. The method of claim 1, wherein the transmitted signal comprises a quadrature amplitude modulation signal in the time domain.

3. The method of claim 1, further comprising the step of equalizing the captured signal to remove linear distortion.

4. A method of determining a presence of nonlinear distortion in a transmitted orthogonal frequency division multiplexing (OFDM) signal, comprising the steps of:
   importing at least one distorted OFDM block in the frequency domain;
   equalizing the imported OFDM frequency domain block to remove linear distortion;
   determining a plurality of OFDM frequency domain symbols from the equalized OFDM frequency domain block;
   creating a frequency domain error series from each of the determined OFDM frequency domain symbols;
   converting the equalized OFDM frequency domain block in the determined OFDM frequency domain symbols into the time domain to form a time domain transmission series;
   converting the frequency domain error series into the time domain to form a time domain error series;
   cross-correlating the time domain transmission series with the time domain error series; and
   measuring a DC term for nonlinear distortion from a result of the step of cross-correlating.

5. A method of determining a presence of nonlinear distortion in a time domain signal, comprising the steps of:
   importing, from the time domain signal, at least one distorted signal block including a plurality of time domain symbols;
   equalizing the imported time domain block to remove linear distortion;
   determining the plurality of time domain symbols from the equalized time domain block;
   creating a time domain transmission series from the equalized time domain block and the determined plurality of time domain symbols;
   creating a time domain error series from each of the determined plurality of time domain symbols;
   cross-correlating the time domain transmission series with the time domain error series; and
   measuring a DC term for nonlinear distortion from a result of the step of cross-correlating.

* * * * *